May 22, 1956
W. E. STEEN
2,746,430
FLUID FLOW MECHANISM
Filed Dec. 6, 1952
5 Sheets-Sheet 2
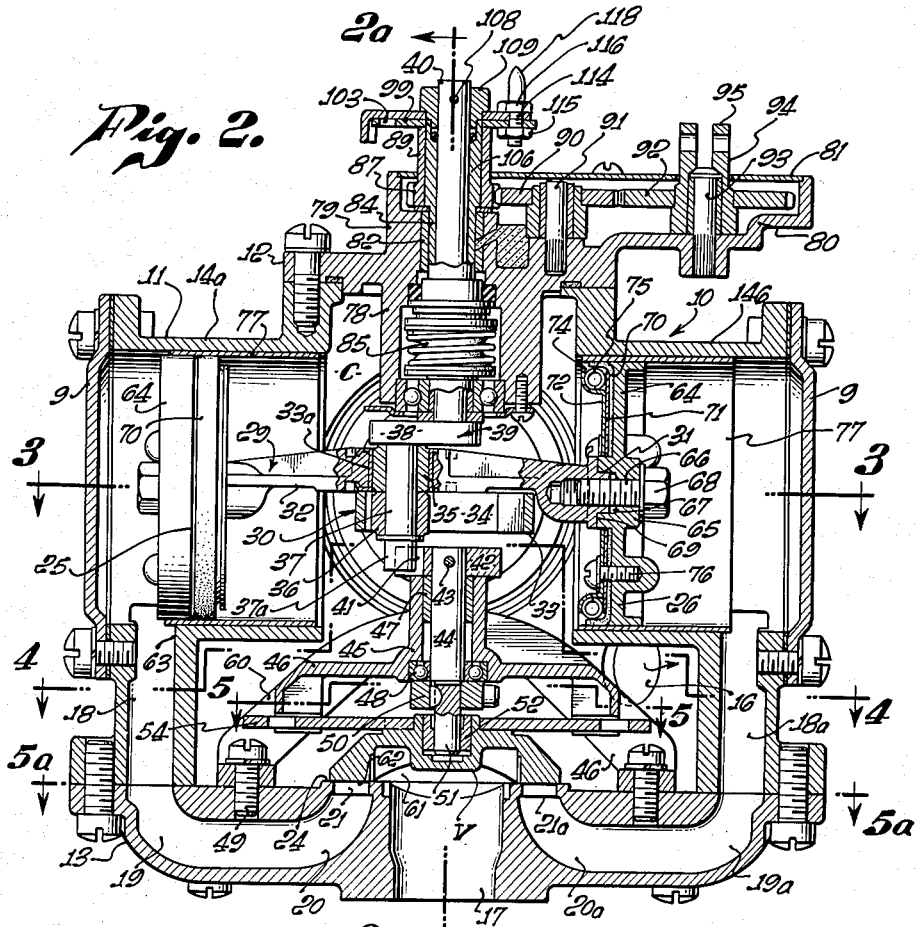
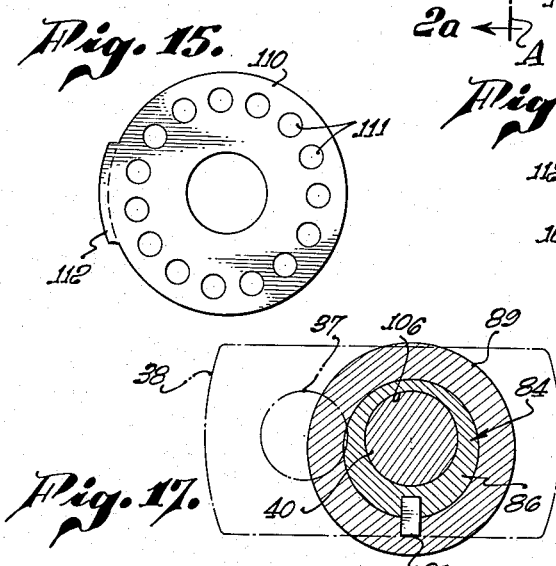
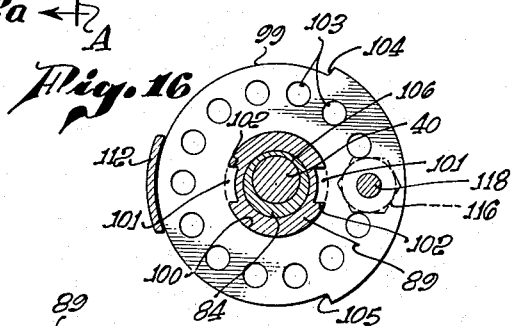
WILLIAM E. STEEN,
INVENTOR.
BY
Barbelew & Scantlebury
ATTORNEYS.

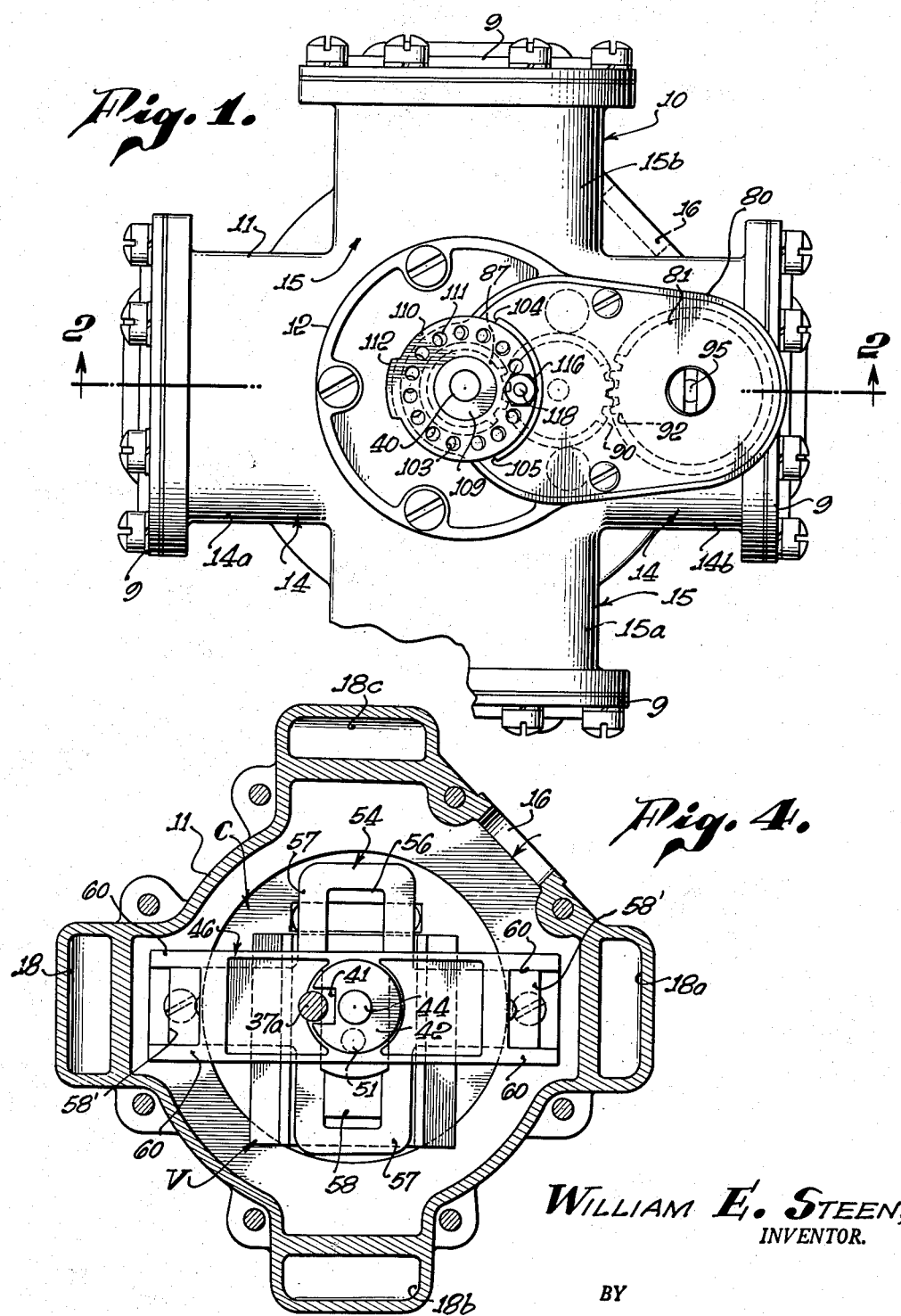

May 22, 1956 W. E. STEEN 2,746,430
FLUID FLOW MECHANISM
Filed Dec. 6, 1952 5 Sheets-Sheet 3
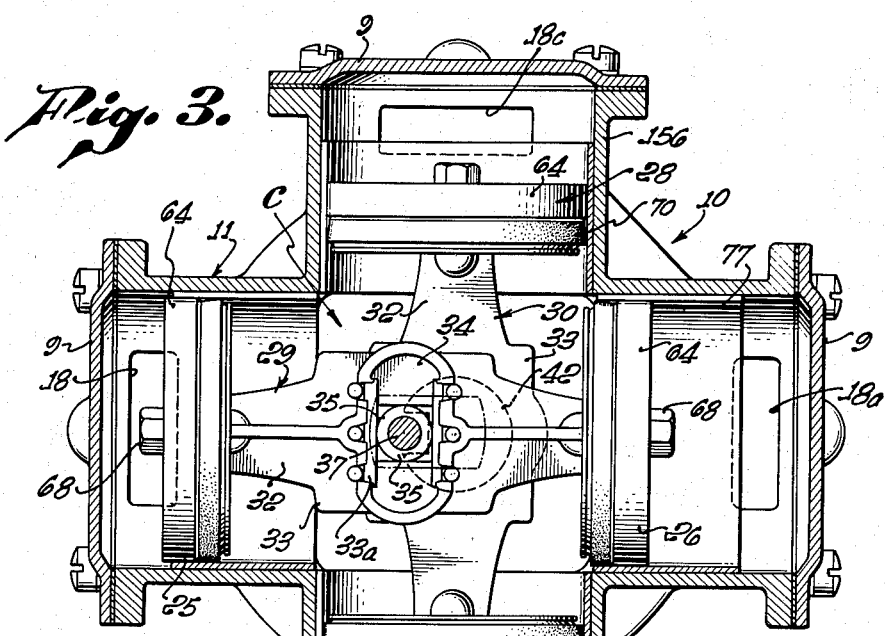
Fig. 3.
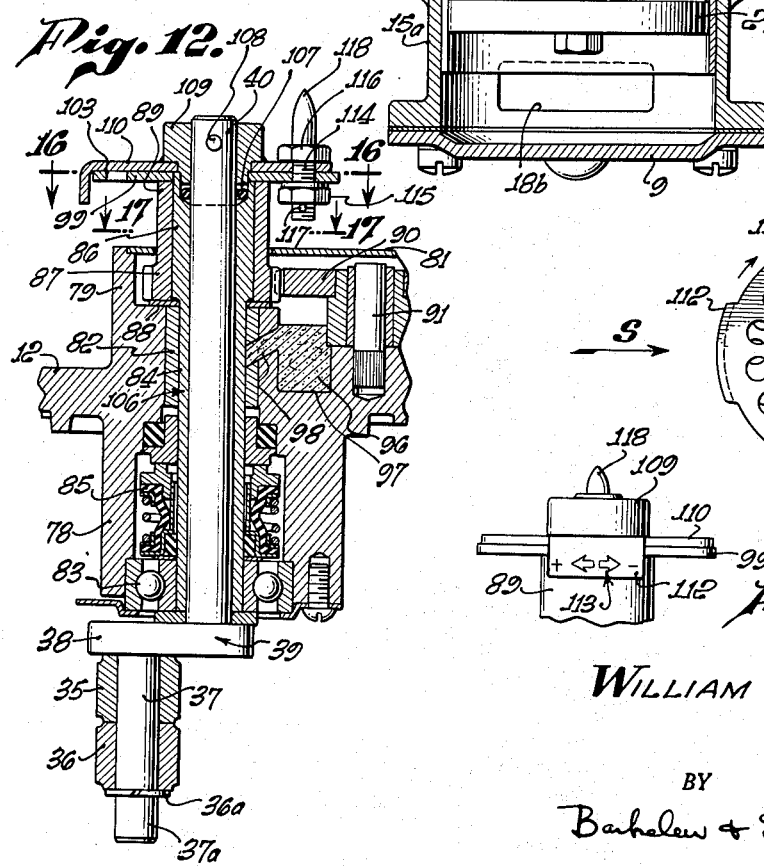
Fig. 12.
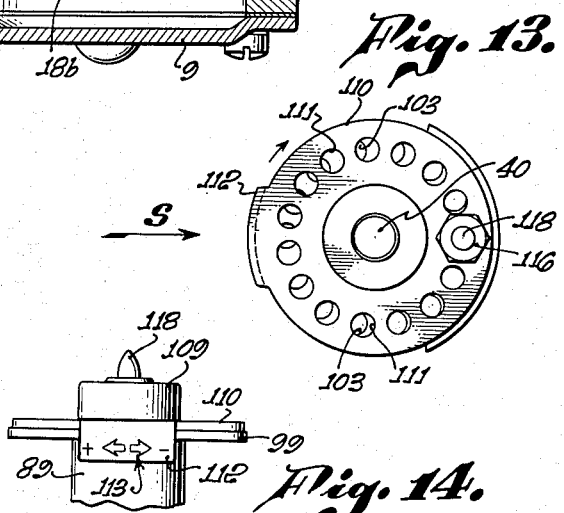
Fig. 13.
Fig. 14.
WILLIAM E. STEEN,
INVENTOR.
BY
Bachelew & Scantlebury
ATTORNEY.

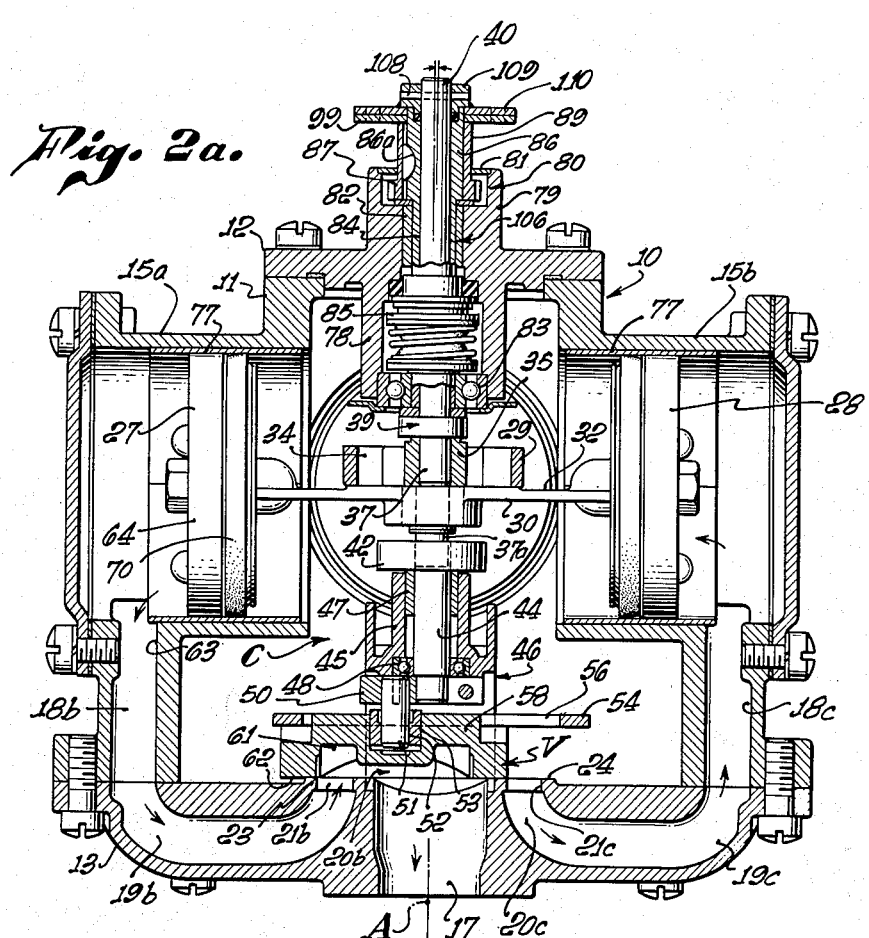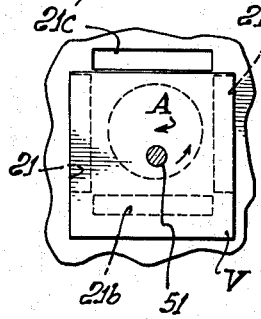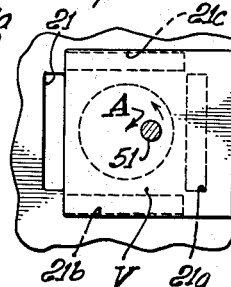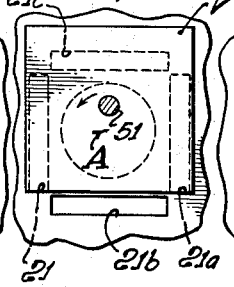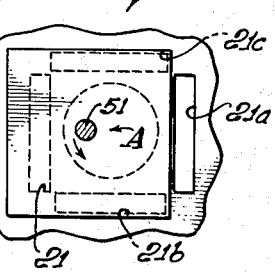

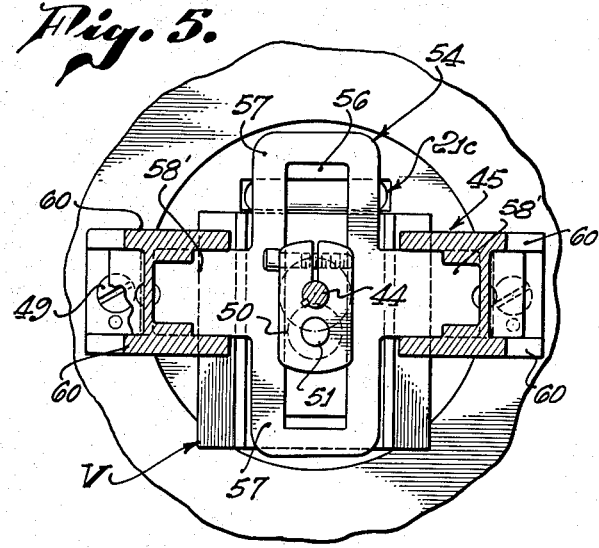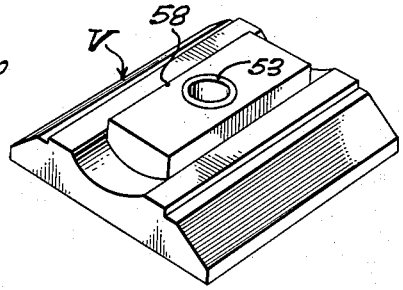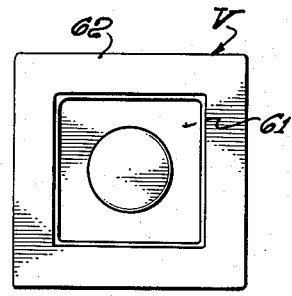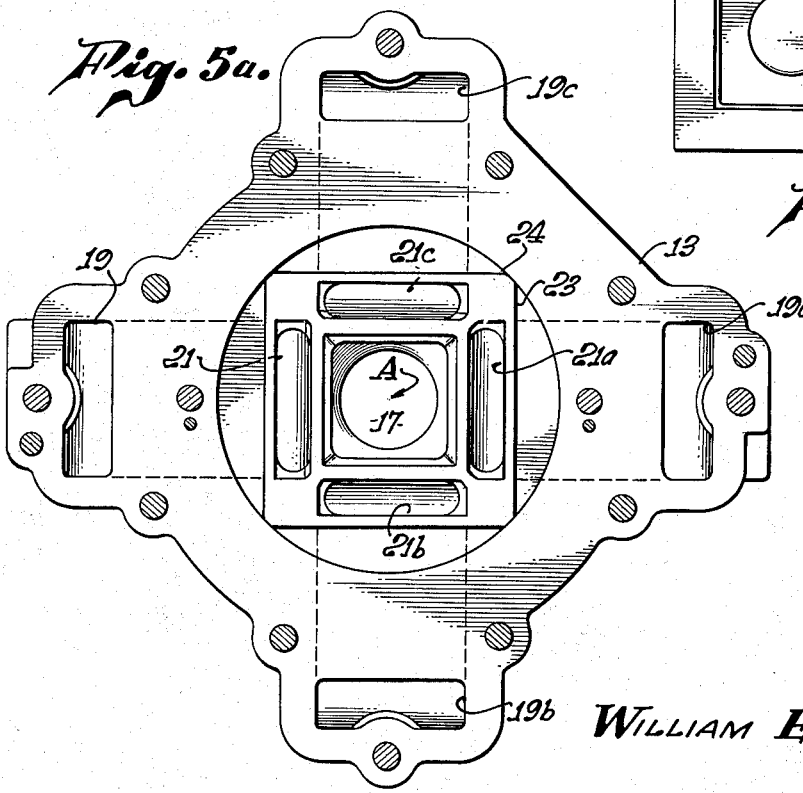

United States Patent Office 2,746,430
Patented May 22, 1956

2,746,430
FLUID FLOW MECHANISM

William E. Steen, South Pasadena, Calif., assignor to A. O. Smith Corporation, Los Angeles, Calif., a corporation of New York Application December 6, 1952, Serial No. 324,567

4 Claims. (Cl. 121—121)

This invention relates generally to fluid flow mechanisms and is particularly useful in the volumetric measurement of flowing fluid.

It is the general object of the invention to provide such a mechanism (to which I will hereinafter refer as a meter) which has the attributes of continuing high accuracy under severe service conditions, of capability of easy and quick adjustment, and of long useful life.

As a particular feature of the invention, we have provided an arrangement of elements and flow passages such that there is no opportunity for lodgment of foreign matter in any critical area or on any critical surfaces—a provision which prevents undue wear and thus not only preserves the accuracy factor but also greatly minimizes the trouble and expense of service and repair. In fact, such foreign matter is swept to and through the outlet by the fluid stream.

The arrangement is such that water which may be in a metered petroleum liquid, for instance, is constantly disposed of so there is no opportunity for corrosive action therefrom. In other words there is no opportunity for the "sumping" of such water.

It is a further object of the invention to provide a meter wherein adjustment is effected with accuracy, ease, and dispatch—an adjustment which is delicate as far as sensitivity is concerned but is rugged as far as structure is concerned.

The meter is also of such construction that in spite of its high capacity, it is extremely compact and light, occupying but little space as compared with other meters having like capacity.

An added feature of the invention is the fashioning of and arrangement of parts whereby minimum power is required to drive it—thus contributing greatly to the high accuracy characteristics.

All the above objects, as well as others, will be made apparent in the following detailed description, reference being had to the accompanying drawings, in which:

Fig. 1 is a top plan view of the meter.

Fig. 2 is an enlarged section on line 2—2 of Fig. 1, with certain parts shown in elevation and others in broken-away section.

Fig. 2a is a section on line 2a—2a of Fig. 2;

Fig. 3 is a section on line 3—3 of Fig. 2;

Fig. 4 is a section on line 4—4 of Fig. 2;

Fig. 5 is a fragmentary section on line 5—5 of Fig. 2;

Fig. 5a is a section on line 5a—5a of Fig. 2;

Figs. 6 to 9, inclusive, are schematic views showing the valve in different positions of the valve-cycle;

Fig. 10 is a perspective view of the movable valve member;

Fig. 11 is a bottom plan view of the movable valve member;

Fig. 12 is an enlarged detail of the adjustment assembly;

Fig. 13 is a fragmentary top plan view of Fig. 12;

Fig. 14 is a view of Fig. 13 looking in the direction of arrow S;

Fig. 15 is a detached, top plan view of the index disk;

Fig. 16 is a section on line 16—16 of Fig. 12; and

Fig. 17 is a section on line 17—17 of Fig. 12.

I will first describe the generalities of the meter structure, and then proceed to a detailed discussion of the mechanism. For purposes of orientation I will refer to "vertical," "horizontal," etc., but it will be understood this is not to be considered as in any way limitative on the claims, except in such cases as the feature being claimed depends upon a specified relationship.

The housing 10 is made up of a body casting 11, an annular cover plate 12, a base 13 and cylinder caps 9, all assembled and bolted together as clearly illustrated, and all made, for instance, of aluminum. The body casting 11 is fashioned to form two sets of opposed cylinders. One set, 14, is made up of diametrically opposed cylinders 14a and 14b, and the other set, 15, is made up of diametrically opposed cylinders 15a and 15b. Sets 14 and 15 are angularly displaced from one another by 90 degrees. Caps 9 form removable covers at the outer ends of the cylinders, while the inner ends of all the cylinders open into the central chamber C defined within housing 10. The axes of all cylinders lie in a common horizontal plane.

The inlet to the meter is provided at 16, and opens to the chamber C. The outlet from the meter is the central opening 17 provided through base 13. Extending vertically downward from the outer end of each cylinder is a passageway leading to an individual horizontal passageway in base 13. Since all these sets of passageways are similar we will describe but one in detail. However, the numerals indicating the passageways are given individual letter subscripts which relate them to specific cylinders. Thus, vertical passageway 18 extends through casting 11 from the outer end of cylinder 14a to the horizontal passageway 19 in base 13. Passageway 19 turns upwardly at 20 and terminates in port 21 which, in the absence of valve V (and, in certain valve positions, in spite of the valve V) opens to central chamber C. The four ports 21, 21a, 21b and 21c are grouped symmetrically about outlet opening 17 as clearly shown in Figs. 6 to 9. The ports 21 and outlet 17 open through a raised "table" 23, integral with base 13, the upper face 24 of this table being exceedingly flat and smooth. Movable valve member V is mounted for horizontal gyration about the extended axis A of the central outlet port 17, in a manner to be described, but for the present it will suffice to say that it is gyrated by piston reciprocation so as to effect sequential coverings and uncoverings of ports 21 to 21c.

We provide two pairs of opposed pistons, one pair being made up of pistons 25 and 26, mounted for reciprocation in cylinders 14a and 14b, and the other pair comprising pistons 27 and 28, mounted for reciprocation in cylinders 15a and 15b, respectively. The pistons of each pair are rigidly connected by a yoke structure so as to reciprocate in unison, one through an intake stroke and the other through an output stroke. The yokes 29 and 30 for the two piston-sets are identical, each being made up of coaxial studs 31 to take the corresponding piston heads and a vertically offset bridge portion 32. One face of the bridge portion is in line with the common axis of the studs so, by turning one yoke upside down, the bridge portions of the yokes do not interfere in spite of the fact that the studs of both yokes lie in a common horizontal plane. The yokes each have a central, enlarged portion 33 which is provided with a transverse way 34 extending at right angles to the yoke axis, the ways of the assembled yokes being normal, one with respect to the other. The side walls of the ways may be lined with wear-members 33a, made, for instance, of very hard and polished stainless steel.

The way 34 of yoke 29 is adapted to take roller 35 and the way 34 of yoke 30 is adapted to take roller 36, the two rollers, which preferably are of bronze, being mounted for rotation on the crank pin 37 which extends from the crank arm 38 of crank 39. The shaft or stem portion 40 of the crank is mounted for rotation in housing cover 12 in a manner later to be described. As will appear, the axis of stem 40 is supported so it is very slightly, and adjustably, eccentrically offset from the central vertical axis A of the meter.

It will also be noted that the piston arrangement is such that when pistons 25 and 26 are, for instance, at the ends of their stroke (Fig. 2) pistons 27 and 28 are at their mid-stroke points (Fig. 2a) it thus being assured there is a constant application of power when the meter is running; that is, no dead center condition can exist.

Rollers 35 and 36 are held to crank pin 37 by detachable lock ring 36a, the pin being extended as at 37a to enter freely in the radial slot 41 of the disk-head 42, the latter being pinned at 43 to shaft 44. In effect, head 42 is a crank arm applied to shaft 44. Shaft 44 is mounted for rotation in the central hub 45 of bridge 46, the mounting being by way of bushing 47 and ball bearings 48. The bridge, in turn, spans valve V and is secured to base 13 at 49. The axis of shaft 44 is coincident with axis A.

Keyed and clamped to shaft 44 below bridge 46 is a crank arm 50, the crank pin 51 extending into a socket 52 represented by the bore of bushing 53, which latter is set into the top face of the square valve member V. It will be seen that rotation of crank 39 by virtue of piston reciprocation, acts through crank pin 37, crank arm 42, shaft 44, crank arm 50 and crank pin 51, to rotate the center point of valve V in a circle concentric with outlet 17. In order to control the valve during such movement, so that it will have the sequential port-opening and closing effect to be described, we provide a shuttle or guide plate 54, fashioned in the form of a cross. A rectangular way 56 extends axially of two opposite arms 57, and is adapted slidingly to take the rectangular boss 58 on valve member V, the plate otherwise resting on top the body portion of the valve. The other two arms 58' are slidingly taken between bridge-arms 60, the guide plate thus being confined to movement which is normal to the axis of way 56. Thus, as the center point of valve member V is rotated about axis A, the guide plate causes the valve member as a whole, to gyrate in such manner that all given side edges of member V remain parallel to their associated ports 21.

The underside of valve V is centrally recessed to provide a passage 61, square, as viewed in plan, the width of the recess being approximately equal to the distance between two opposite ports 21, 21a, or 21b, 21c. The under face of the square "rim" 62 of member V is lapped to be exceedingly flat and smooth, so it is, in effect, in sliding sealing engagement with the flat smooth face 24 of table 23. The valve is preferably made of such material as carbon compositions or bronze, giving it particular good qualities for the particular service it is called upon to perform.

The timing of the valve and pistons is as follows: Assume the meter is in the condition of Figs. 2, 2a, and 6, and that fluid is being admitted to chamber C through inlet 16. Ports 21 and 21a are, at that instant, completely closed by the associated rim portions 62 of member V, while port 21c, at that instant, fully open to chamber C; and port 21b and outlet 17 are in full communication through valve recess 61. Accordingly (see Fig. 2a) fluid flows under pressure from chamber C through port 21c, passageways 19c and 18c into cylinder 15b, forcing pistons 28 and 27 to the left. Piston 27 pushes the fluid ahead of it, delivering the previously measured charge in cylinder 15a to outlet 17, through passages 18b, 19b, port 21b and recess 61.

The left-wise movement of pistons 27, 28 actuates crank 39, which not only rotates shaft 40, but also acts to shift pistons 25 and 26 to the right in Fig. 2, and, through crank 42, shaft 44, crank 50 and shuttle 54, to shift valve member V towards the position of Fig. 7, thus gradually closing ports 21c and 21b and gradually opening ports 21 and 21a. By the time crank 50 has rotated 90° from the position of Fig. 6, the valve will be in the condition of Fig. 7 and fluid from chamber C will flow through full open port 21 and passages 19, 18 to cylinder 14a, thus forcing pistons 25 and 26 to the right from the positions of Fig. 2. At the same time the full open port 21a will deliver the previously measured charge from cylinder 14b to outlet 17 through passageways 18a, 19a, port 21a and recess 61.

At the end of the next 90° rotation of crank 50 (Fig. 8) ports 21b and 21c are fully open, so pistons 27, 28 are moved to the right (Fig. 2a) thus fully opening ports 21b and 21c, but with chamber C now in communication with cylinder 15a, and outlet 17 in communication with cylinder 15b. Thus the measured charge which powered the meter by its entry to cylinder 15b is now discharged through the outlet.

At the end of the next 90° rotation of crank 50, (Fig. 9) ports 21b and 21c are fully closed and ports 21, 21a are fully open, but now port 21a receives the fluid from chamber C and thus acts against piston 26 to drive it and piston 25 to the left (that is, toward the position of Fig. 2) the measured charge which previously powered piston 25 thus being delivered to the outlet 17, through passages 18, 19, port 21 and recess 61.

Thus, during a full 360° rotation of crank 50 (and hence of stem 40) there has been a complete filling and emptying of all four cylinders and therefore, by "counting" the number of rotations of stem 40, and calibrating the counter in terms of gallonage, the total delivery of fluid during a given run may be ascertained.

It will be noted that at the extreme end of a delivery stroke each piston (see piston 25 in Fig. 2) extends beyond the inner wall 63 of passageway 18, it thus being assured that the cylinder is swept entirely clear of any foreign matter that otherwise might be left on a "shelf." Such foreign matter as may be present is displaced or fluid-swept through the passageways 18, 19, 20 and port 21 into the outlet—none of it can gather in a low spot or sump, as is so frequently the case in usual meters. Water which might otherwise tend to gather in passageways 19 is displaced and positively moved to and through the outlet by the rush of fluid through those passageways. Thus all the dangers of abrasion, corrosion and wear due, in usual meters, to the settling or gathering of foreign matter are obviated.

The pistons 25 to 28, inclusive, are identical, so but one need be described in detail. A rigid body member or disk 64, has a hub 65 which is bored at 66 and counterbored at 67, the counterbore 67 taking yoke-stud 31, and bore 66 passing the bolt 68 which is threaded into the end of the stud and holds hub 65 snugly against the stud flange 69. Engaging the inner face of disk 65 is a cup-leather 70, the bottom of which is engaged by circular plate 71. Overlying the plate is a rigid spring-retainer 72 having an annular flange 73 which, with the flange of the cup-leather, defines a groove 74 for receiving the endless coil spring 75. The unit is held in assembly by screws 76, and spring 74 tends constantly to hold the cup-leather flange in effective engagement with the cylinder wall.

As a special feature, I provide a novel lining 77 for the cylinders, a lining which has been found to withstand all normal and many abnormal wear effects, and yet is of the simplest nature and is capable of being installed with a minimum of effort and time. Starting with a flat blank of stainless steel, I highly polish the side which is to become the piston-engaging face thereof, this polishing being easily accomplished when the stock is flat. The strip is cut to a length which is slightly greater than that of the circumference of the cylinder bore and then rolled into approximate ring form; that is, it is rolled to a diameter somewhat larger than the diameter of the cylinder so the ends of the original strip are circumferentially spaced slightly apart. The ring is then radially sprung to close the gap and force-fitted into the cylinder bore to the position clearly shown in Fig. 2, except that the "seam" is located at the top of the bore rather than as shown, the showing being made as it is merely to simplify the drawings.

The force fit is sufficient to hold the sleeve 77 firmly in place, it being noted that the piston at the extreme end of its delivery stroke (piston 25 in Fig. 2) extends beyond the end of the lining 77 so the lining may be entirely swept clear of foreign matter that might otherwise lodge thereon.

I will now describe the mounting of crank 39 and the adjustment feature of the meter, making special reference to Figs. 2, 2a and 12 to 17, inclusive. Cover 12 has a depending boss 78 and a coaxial upwardly extending boss 79, the cover being extended and cupped to form a gear housing 80 which is completed by a removable cap-plate 81. Mounted for rotation in cover 12 by bushing 82 in boss 79 and ball bearings 83 in boss 78, is a sleeve 84 whose axis of rotation is coincident with axis A. The sleeve is packed off from hub 78 by the conventional oil sealing means indicated generally at 85.

Keyed at 86a to the head portion 86 of sleeve 84 is a pinion 87 which bears on washer 88 and has an elongated hub 89. The pinion meshes with idler gear 90 which is supported on stud shaft 91 press-fitted into cover 12, the idler, in turn, meshing with gear 92 which is journaled on cover-supported stud shaft 93. The upper end of the hub 94 of gear 92 projects through cap plate 81 and is exteriorly forked at 95 for connection with any suitable register or computer (not shown) whereby the rotation of sleeve 84 is translated into quantities of fluid delivered to outlet 17.

A pad of oil-impregnated felt 96 is retained in cover-pocket 97 and a wick 98 leads from the felt through passages in boss 79 and bearing bushing 82 to sleeve 84 for the purpose of lubricating the latter.

A circular index plate 99 has a bore 100 (Fig. 16) to take the upper end of pinion hub 89, the plate having radial tongues 101 fitting into hub-notches 102 to hold the pinion and plate against relative rotation. The plate is pierced with a circular series of equally spaced index holes 103 and has angularly spaced stop shoulders 104 and 105.

Sleeve 84 has an eccentric bore 106 adapted to take crank stem 40, the sleeve and stem being packed off by O-ring 107. Pinned at 108 to stem 40 is the hub 109 which is brazed to index disk 110, the latter directly overlying index plate 99. The disk is provided with a circular series of equi-angularly spaced index holes 111 and a down-turned lip 112, which latter lies in the path of shoulders 104, 105 to limit the relative rotation of members 99 and 110 during adjustment, as will appear. Indicia 113 (Fig. 14) indicates the directions of plate-movement to accomplish plus and minus corrections. The center of plate bore 100 (Fig. 16) is eccentrically offset from the center of the circular series of holes 103 in such a direction and amount as will axially register holes 103 and 111 in spite of the eccentric relationship of stem 40 and sleeve 84.

A seal pin 114 is extended through mating holes 111 and 103 in members 110 and 99, respectively, to lock those two members in relatively adjusted positions, the nut 115 and pin head 116 clamping the two members together, a seal wire (not shown) being adapted to be passed through hole 117 in pin 114 below nut 115 to prevent unauthorized adjustment. The nose 118 of pin 114 is roughly conical or bullet shaped to enable use of the pin (when it is detached) in lining up holes in members 110 and 99 during adjustment.

It will be seen that stem 40 is pinned to member 110, member 110 is adjustably held to member 99 by pin 114, member 99 is keyed to gear hub 89 at 101, 102, and gear hub 89 is keyed to sleeve 84 at 86a. Consequently, when stem 40 is rotated by reason of crank actuation through piston-reciprocation, members 110, 99, pinion 87 and sleeve 84 rotate as one, and a single revolution of stem 40, representing a complete metering cycle, imparts a single revolution to pinion 87.

Now it has been said that stem 40 is eccentrically mounted in sleeve 84. It will be seen that if the sleeve and stem be relatively rotated and then reclamped together, the effective throw of crank 38 is varied and, accordingly, the volumetric output of the meter per cycle will be varied slightly. For instance (remembering that the axis of rotation of crank arm 38 is at A when members 99 and 110 are clamped together) if, when unclamped, member 110 is rotated clockwise (Fig. 17) with relation to member 99 and then reclamped, stem 40 and crank arm 38 will have shifted the distal end of crank arm 38 and hence pin 37 to a position more remote from axis A. This lengthens the effective throw of crank arm 38 and hence the stroke of the pistons, thus increasing the volumetric output of the meter per stroke and hence cycle.

For the particular meter here illustrated it has been found that a satisfactory range of adjustment can be secured if the extent of eccentricity between stem 40 and sleeve 84 be in the order of .020", though this is not at all limitative. In order to divide the total adjustment capacity into small, uniform increments, index disk 110 is provided with the 15 equally spaced holes 111, and index plate 99 is provided with the 14 equally spaced holes 103. As is clear from Fig. 13, by removing pin 114 from the adjustment assembly, relatively rotating members 99 and 110 until different selected sets of holes 103 and 111 are brought into register and entry of pin 114 in the newly registering holes, the effective length of crank 38 is established to have a predetermined value within the range established by the total extent of eccentricity between members 40 and 84.

In the various figures, members 40 and 84 have been adjusted and fixed in such positions that the crank arm 38 is of median effective length. By shifting disk 110 clockwise with respect to plate 99, the effective length of the crank is increased, and, by an opposite shift, the effective length of the crank arm is decreased.

While I have illustrated and described a preferred embodiment of my invention, various changes in design, character and shape may be made without departing from the spirit and scope of the appended claims.

I claim:

1. A fluid flow mechanism embodying a housing, a pair of horizontally arranged, diametrically opposed cylinders within the housing and axially spaced apart, the inner ends of the cylinders opening to a central chamber defined within the housing, and the outer ends of the cylinders opening to passageways defined within the housing walls, there being a fluid inlet to said chamber and there being a fluid outlet through the bottom wall of the housing, said passageways extending, one each, vertically downwardly from the outer ends of the cylinders, thence horizontally through said bottom wall and finally upwardly through said bottom wall to form a port opening into said chamber, a pair of pistons, one in each of said cylinders, said pistons being rigidly connected for simultaneous movement through their associated cylinders, a valve member mounted on said bottom wall for movement thereover in a manner to selectively put said ports into communication with the central chamber and said outlet, an operative connection between said pistons and said valve whereby piston reciprocation so moves said valve member, said operative connection including a bridge member within the chamber and secured to the bottom wall of the housing, and bridge member spanning the valve, a vertical crank shaft journaled in said bridge member, a crank arm on said shaft below the bridge, a crank pin on the arm and entered for rotation in a socket provided in said valve, all in a manner whereby crank shaft rotation sets up horizontal gyration of said valve member, and means holding said valve member against rotation, said last named means embodying a horizontal shuttle plate resting on top the valve, means on the bridge member limiting upward movement of the shuttle plate, means on the bridge member engaging opposite sides of the shuttle member to restrict it to horizontal reciprocation in one direction, there being an elongated slot in said shuttle plate extending in a direction at a right angle with respect to said one direction, and a non-circular lug on and rigid with respect to the valve member and entered in said slot and engaged with the side-defining walls thereof, said lug being movable lengthwise of the slot.

2. A fluid flow mechanism embodying a housing including a body member and a bottom member detachably secured to the body member, a central table projecting upwardly from the top face of the bottom and into a central chamber provided within the housing, a flat, horizontal and upwardly presented surface on said table, said chamber being defined in part by the upper face of the bottom member where it surrounds said table, a pair of horizontally arranged, diametrically opposed cylinders formed within the body member with their inner ends opening to said chamber, the outer ends of said cylinders opening to passageways defined within the housing walls, there being a fluid inlet to the chamber directly from the outside of the housing, and there being a vertical fluid outlet through said bottom member and extending downwardly from the center of said presented table surface, said passageways each comprising a straight, vertical channel provided in the body member and extending downwardly from the outer end of the associated cylinder, a horizontal channel provided in said bottom member, the vertical channel opening directly into the horizontal channel, and a vertical channel provided in said bottom member, said last mentioned channel opening from said horizontal channel and opening, as a port, to said presented table surface at one side of the fluid outlet, said presented surface being spaced vertically above the junction of the horizontal channel and the first named vertical channel, but spaced below said cylinders, a pair of pistons, one in each of said cylinders, said pistons being rigidly connected for simultaneous reciprocation in their associated cylinders, a valve member on said presented table surface for sliding movement thereover to selectively put said ports into communication with the central chamber and said outlet, and an operative connection between said pistons and said valve whereby piston reciprocation so moves said valve member.

3. A mechanism as in claim 2 wherein said valve member is completely below said cylinders.

4. A fluid flow mechanism embodying a housing including a body member and a bottom member detachably secured to the body member, a central table projecting upwardly from the top face of the bottom member and into a central chamber provided within the housing, a flat, horizontal and upwardly presented surface on said table, said chamber being defined in part by the upper face of the bottom member where it surrounds said table, a pair of horizontally arranged, diametrically opposed cylinders formed within the body member with their inner ends opening to said chamber, the outer ends of said cylinders opening to passageways defined within the housing walls, there being a fluid inlet to the chamber, and there being a vertical fluid outlet through said bottom member and extending downwardly from the center of said presented table surface, said passageways each comprising a straight, vertical channel provided in the body member and extending downwardly from the outer end of the associated cylinder, a horizontal channel provided in said bottom member, the vertical channel opening directly into the horizontal channel, and a vertical channel provided in said bottom member, said last mentioned channel opening from said horizontal channel and opening, as a port, to said presented table surface at one side of the fluid outlet, said presented surface being spaced vertically above the junction of the horizontal channel and the first named vertical channel, but spaced below said cylinders, a pair of pistons, one in each of said cylinders, said pistons being rigidly connected for simultaneous reciprocation in their associated cylinders, a valve member on said presented table surface for sliding movement thereover to selectively put said ports into communication with the central chamber and said outlet, and an operative connection between said pistons and said valve whereby piston reciprocation so moves said valve member, said operative connection including means for horizontally gyrating said valve member, and means holding said valve member against rotation, said last means including a bridge member secured to the bottom member and spanning said valve, a horizontal shuttle plate restricted, by engagement with said bridge member, to horizontal reciprocation in one direction, there being an elongated slot in said shuttle plate extending lengthwise in a right-angular direction with respect to said one direction, and a non-circular lug on the valve member and entered in said slot and engaged with the side-defining walls thereof, said lug being movable lengthwise of the slot; said shuttle plate lying in a plane spaced vertically below said cylinders.

References Cited in the file of this patent

UNITED STATES PATENTS

| | | |
|---|---|---|
| 382,145 | Dick | May 1, 1888 |
| 1,893,595 | Perkins et al. | Jan. 10, 1933 |
| 1,971,433 | Tartrais | Aug. 28, 1934 |
| 2,055,710 | Smith | Sept. 29, 1936 |
| 2,106,651 | Parker et al. | Jan. 28, 1938 |
| 2,170,015 | Ford | Aug. 22, 1939 |
| 2,356,273 | Risser | Aug. 22, 1944 |
| 2,503,881 | Manis | Apr. 11, 1950 |
| 2,601,966 | Busick | July 1, 1952 |
| 2,628,595 | Waldie et al. | Feb. 17, 1953 |
| 2,630,101 | Batchelder | Mar. 3, 1953 |

FOREIGN PATENTS

| | | |
|---|---|---|
| 18,675 | Great Britain | 1895 |
| 28,999 | Australia | Sept. 15, 1930 |